H. D. CHURCH.
MOTOR VEHICLE.
APPLICATION FILED JULY 31, 1912.

1,122,074.

Patented Dec. 22, 1914.

Witnesses
Chas. J. Fitzsimons
LeRoi A. Williams

Inventor
Harold D. Church
by Willis Tibbetts
Attorney

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,122,074. Specification of Letters Patent. Patented Dec. 22, 1914.

Application filed July 31, 1912. Serial No. 712,537.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and particularly to motor truck or commercial vehicle construction.

Strength, durability and cheapness of manufacture are among the points aimed at by the commercial vehicle engineer. A simple construction that lends itself well to manufacture is the construction sought in the designing of motor trucks. The present invention is an improvement upon previous truck constructions and is novel particularly in its practical manufacturing advantages.

One of the objects of this invention is to provide a vehicle comprising a frame and axle, with suitable side or longitudinal springs and a transverse auxiliary spring which is adapted to assist in sustaining an overload and in checking the rebound of the frame or truck body caused by passing over irregularities in the roadbed. This, and other objects of the invention, are apparent from the detailed description taken in connection with the drawings which form a part of this application, and in which—

Figure 1:
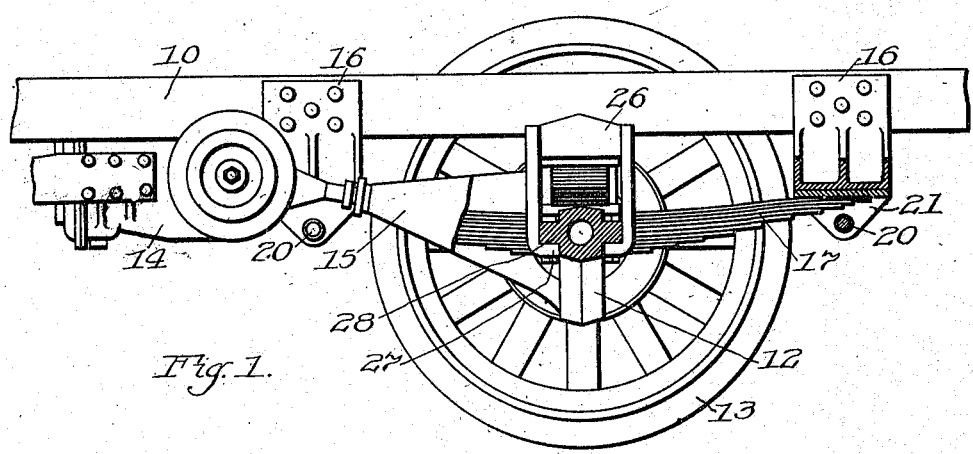
Figure 2:
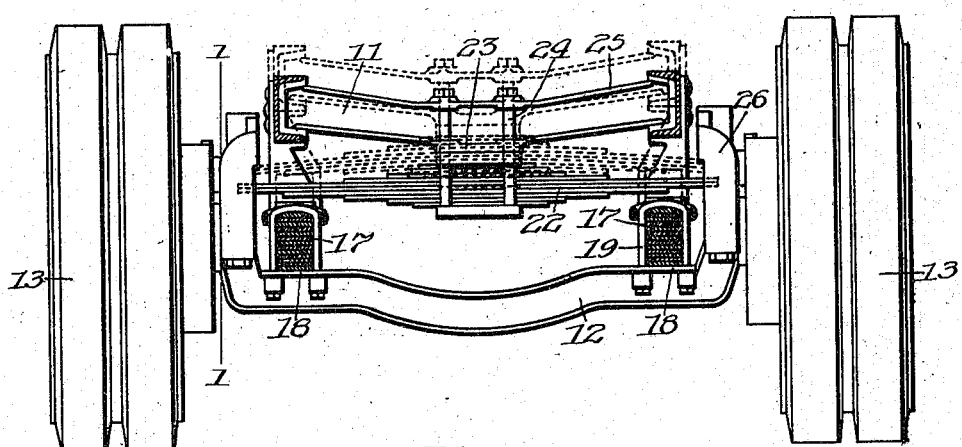
Figure 3:
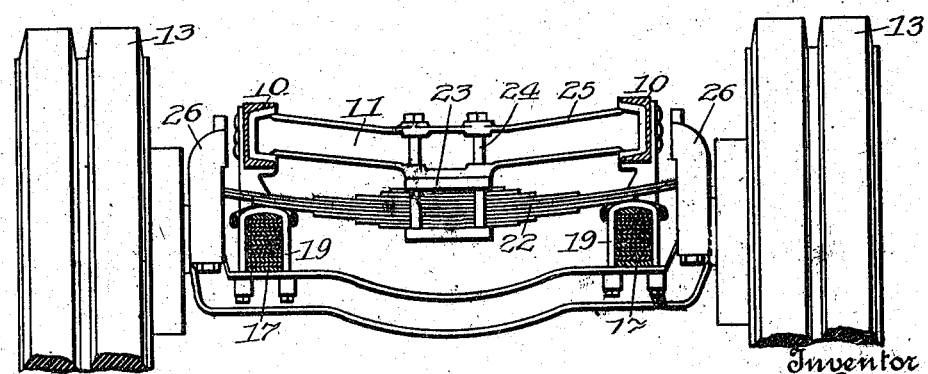

Figure 1 is a side elevation and part longitudinal sectional view of the rear portion of a motor truck, the section being substantially on the line 1—1 of Fig. 2; Fig. 2 is a rear elevation of, and part transverse sectional view through, the vehicle shown in Fig. 1; and Fig. 3 is a view similar to Fig. 2 with the frame and axle in different relative positions.

Referring to the drawings, 10 represents the two side members of the vehicle frame and 11 is one of the cross members which is shown as being of I-beam construction and connecting the side members. Other cross members may be employed as desired to give the frame proper strength. The cross member 11 is arranged directly over the vehicle rear or driving axle 12, on the outer ends of which are the wheels 13 which support one end of the vehicle.

The wheels may be driven through any suitable driving mechanism such as the gearing contained in the gear box 14, and the axle is properly positioned relative to the frame by means of radius rods 15 which may be adjustable.

Each of the side-members 10 is provided with a pair of brackets 16 properly secured thereto and arranged substantially equidistant fore-and-aft of the axle and the cross member 11. Side springs 17 are secured to suitable seats 18 on the axle 12 by means of spring clips 19. The free ends of the springs 17 engage the under sides of the brackets 16 and are arranged to slide thereon as the frame moves relative to the axle, as will be clearly seen in Fig. 1. Bolts 20, through ears 21 on the brackets 16, are arranged to engage the undersides of the ends of the springs 17 for taking the rebound of the frame.

The springs 17 are of sufficient strength to take a given load on the frame or body of the vehicle, and it is desirable to have an auxiliary spring which is normally inactive but which comes into operation when the vehicle is loaded beyond a given amount. In the present invention this auxiliary spring is in the form of a transverse leaf spring which is reinforced both above and below so that it will take the overload on the rebound as will be more fully hereinafter described. This auxiliary transverse spring 22 is secured to a seat 23 on the under side of the cross member 11 by means of spring clips 24 which pass through holes in both of the flanges 25 of the I-beam cross member. This makes a very secure construction for the auxiliary spring 22 and places the nuts for the spring clips in an accessible position so that they may easily be kept tight.

Normally the spring 22 is inactive as shown in full lines in Fig. 2 but when the vehicle is loaded beyond a given amount the spring comes into action by its ends engaging the springs 17 at their centers where they are secured to the axle, as shown particularly in Fig. 3. Upon the rebound of the frame relative to the axle the parts are in the position shown in the dotted lines in Fig. 2, in which it will be seen that the extreme outer ends of the springs 22 engage under brackets 26 which are secured to the axle 12. These brackets 26 are of inverted U-shape as shown particularly in Fig. 1 and they are formed with inturned ends 27 which are arranged to hook under lugs 28 formed integral with the axle 12 just outboard from the spring seats 18. These ends 27 are bolted to the lugs 28 to hold the brackets 26 in place but it will be seen that the rebound strains are not taken by the bolts themselves but by the inturned ends 27. It will also be seen that the spring 22 engages the brackets 26 at points beyond its engagement with the springs 17 so that greater resiliency is obtained from spring 22 on the rebound than on the overload. Also where the frame members 10 are located directly over the springs 17, the springs 22 may be given a wider range of action by arranging the brackets 26 outside of spring 17 than as if they were located between the spring 17 and the frame.

It is believed that the operation of the structure is plain from the above description and the drawings.

Having thus described my invention what I claim and desire to secure by Letters Patent is:

1. In a vehicle, the combination with the frame, the axle, and the side springs, of an auxiliary spring secured to the frame and adapted to engage the axle as the frame moves downwardly, and a bracket adapted to engage said auxiliary spring on the rebound at a point more remote from the center of the spring than its point of engagement with the axle.

2. In a vehicle, the combination with the frame, the axle, and the side springs, of an auxiliary spring secured to the frame and adapted to engage the axle as the frame moves downwardly, and a bracket secured to the axle and adapted to engage said auxiliary spring on the rebound at a point more remote from the center of the spring than its point of engagement with the axle.

3. In a vehicle, the combination with the frame, the axle, and the side springs, of an auxiliary spring secured to the frame and adapted to engage the axle as the frame moves downwardly, and a bracket mounted on the axle outside the side springs and adapted to engage said auxiliary spring on the rebound at a point more remote from the center of the spring than its point of engagement with the axle.

4. In a vehicle, the combination with the frame, the axle, and the side springs, of a transverse auxiliary spring, and brackets mounted on the axle outboard from the side springs and adapted to engage said auxiliary spring on the rebound.

5. In a vehicle, the combination with the frame, the axle, and the side springs, of a transverse auxiliary spring adapted to engage the side springs where they are secured to the axle, and brackets mounted on the axle outboard from the side springs and adapted to engage said auxiliary spring on the rebound.

6. In a vehicle, the combination with the frame, the axle, and the side springs, of a transverse auxiliary spring reinforced above and below and adapted to engage the side springs where they are secured to the axle, and brackets mounted on the axle outboard from the side springs and adapted to engage said auxiliary spring on the rebound.

7. In a vehicle, the combination with the frame having side members, the axle, and the side springs arranged directly beneath the side frame members and connecting the latter with the axle, of a transverse auxiliary spring, and brackets mounted on the axle outboard from the side springs and adapted to engage said auxiliary spring on the rebound.

8. In a vehicle, the combination with the frame, the axle, and the springs, of a rebound bracket mounted on the axle and having a part thereof hooked under a part of the axle, one of said springs coöperating with said bracket.

9. In a vehicle, the combination with the frame, the axle, and the springs, said axle having a lug, of a rebound bracket mounted on the axle and having a part hooked under said lug, one of said springs coöperating with said bracket.

10. In a vehicle, the combination with the side members of the frame, a cross member connecting the side members, a transverse spring secured to the under side of the cross member, and a pair of brackets on each side member equi-distant fore-and-aft of said cross member, of an axle arranged beneath the cross member, longitudinal springs secured to the axle and having their ends engaging said brackets, the ends of said transverse spring engaging said longitudinal springs where they are secured to the axle, and brace rods between the frame and axle.

In testimony whereof I affix my signature in the presence of two witnesses.

HAROLD D. CHURCH.

Witnesses:
J. B. BOYCE,
LE ROI J. WILLIAMS.